United States Patent [19]

Morse

[11] Patent Number: 5,257,020
[45] Date of Patent: Oct. 26, 1993

[54] VARIABLE MESSAGE TRAFFIC SIGNALLING TRAILER

[75] Inventor: Robert H. Morse, Westborough, Mass.

[73] Assignee: Fiber-Optics Sales Co., Inc., Worcester, Mass.

[21] Appl. No.: 714,259

[22] Filed: Jun. 12, 1991

[51] Int. Cl.$^5$ ............................................ B60Q 7/00
[52] U.S. Cl. ................................. 340/908.1; 340/471; 340/473; 340/815.27; 340/908
[58] Field of Search ...................... 340/908, 908.1, 471, 340/472, 473, 479, 470, 815.12, 815.23, 815.24, 815.27

[56] References Cited

U.S. PATENT DOCUMENTS

| | | | |
|---|---|---|---|
| 2,920,408 | 1/1960 | McGuire | 40/52 |
| 3,702,033 | 11/1972 | Coleman | 40/129 R |
| 3,727,214 | 4/1973 | Wayne | 340/324 R |
| 3,768,073 | 10/1973 | Rawson et al. | 340/172.5 |
| 3,883,846 | 5/1975 | Bruner | 340/908 |
| 4,006,476 | 2/1977 | Romney | 340/815.27 |
| 4,077,144 | 3/1978 | Smits | 40/590 |
| 4,087,785 | 5/1978 | Dodich | 340/908.1 |
| 4,095,215 | 6/1978 | Mortimer | 340/311 |
| 4,268,826 | 5/1981 | Scott et al. | 340/707 |
| 4,271,408 | 6/1981 | Teshima et al. | 340/702 |
| 4,543,905 | 10/1985 | McKenney | 116/63 P |
| 4,571,868 | 2/1986 | Forestal | 40/590 |
| 4,574,269 | 3/1986 | Miller | 340/97 |
| 4,593,265 | 6/1986 | McKenney | 340/908.1 |
| 4,868,542 | 9/1989 | Thompson | 340/479 |
| 4,868,719 | 9/1989 | Kouchi et al. | 362/61 |
| 4,928,084 | 5/1990 | Reiser | 340/479 |
| 5,061,921 | 10/1991 | Lesko et al. | 340/815.24 |

OTHER PUBLICATIONS

"Traffic Control Products from Signal", Feb. 24, 1983 340/908.1 by Lear Siegler, Inc. signal division.
Bemis & Son, Inc. "Bemis . . . the name in flashing Arrows?" Feb. 24, 1983 by Bemis & Son, Inc.

Primary Examiner—John K. Peng
Assistant Examiner—Edward Lefkowitz
Attorney, Agent, or Firm—Fish & Richardson

[57] ABSTRACT

A moveable traffic signaling which includes a trailer having wheels and a supporting structure; a general purpose message board supported by the supporting structure of the trailer, for communicating to drivers of passing vehicles a user-selected alpha-numeric message; an operator interface mounted on the supporting structure, for programming the message to be displayed at the site at which it is to be displayed; and a controller supported by the supporting structure, connected to interact with the operator interface and connected to provide the programmed message to the message board.

36 Claims, 3 Drawing Sheets

VARIABLE MESSAGE TRAFFIC SIGNALLING TRAILER

BACKGROUND OF THE INVENTION

The invention relates to traffic signalling trailers.

Known traffic signalling trailers typically include an illuminated sign mounted on a trailer and may be generally placed on or near the road in order to warn passing motorists of hazards lying ahead. The sign is mounted on a trailer, so it can be moved from place to place as needed, e.g., at construction sites.

SUMMARY OF THE INVENTION

In general, the invention features a moveable traffic signaling device. The device includes a trailer having wheels and a supporting structure; a general purpose message board supported by the supporting structure of the trailer, for communicating to drivers of passing vehicles a user-selected alpha-numeric message; an operator interface mounted on the supporting structure, for programming the message to be displayed at the site at which it is to be displayed; and a controller supported by the supporting structure, connected to interact with the operator interface and connected to provide the programmed message to the message board.

In preferred embodiments, the operator interface includes an input device connected to the controller, for receiving on-site operator input and a display connected to the controller for displaying the message to the operator; the device is adapted to display the message on the display before the message is sent to the message board; the input device is a keyboard and the display is a full-screen CRT display; the message board includes a plurality of picture elements for displaying the message; the plurality of picture elements (pixels) includes light emitting diodes; each picture element (pixel) includes four of the light emitting diodes; the message board further includes a plurality of power supplies each connected to some of the picture elements (pixels), and the power supplies are independently short-circuit protected; the message board includes at least 3584 light emitting diodes per line; the message board is capable of displaying at least three lines of 18 inch characters with 1-8 characters per line, and each line is capable of being sub-divided into two separate lines of approximately 9 inch characters; the controller is adapted to cause the picture elements (pixels) to flash at a variable, operator-selectable rate when programmed to do so by the operator; the controller is adapted to cause the picture elements (pixels) to be displayed at a dim intensity, for improved night viewing when programmed to do so by the operator; the message board further includes a thermostat connected to at least one cooling fan, for cooling the message board; the controller includes memory for storage of messages; the memory includes storage for pre-determined messages, and storage for user-defined messages; the device further includes a generator group for powering the message board and the operator interface; the generator group includes a surge suppressor; the support structure includes a bed and a superstructure, and the message board is mounted on a frame that is pivotably mounted on the superstructure so as to be pivoted between a stowed position and a display position; the superstructure further includes a shock absorbing structure for supporting the message board when in the stowed position; the device further includes a lift mechanism mounted on the superstructure and connected to the frame via a cable, for raising and lowering the message board; the device further includes a lockable cage positioned on shock mounts mounted on the supporting structure of the trailer, for housing the controller and the user interface, and protecting the controller and the user interface from shocks; the device further includes a modem and a cellular telephone set connected to the controller for receiving off-site commands to change the message; the device further includes a computer interface connected to the controller for communicating directly with the controller; the message board is made up of a plurality of panels, each of the panel being replaceable separately; the device further includes a plurality of leveling jacks attached to the supporting structure of the trailer, for leveling the trailer and preventing it from being tipped over by wind.

In another aspect, the invention features a moveable traffic signaling device that includes a trailer having wheels and a supporting structure, the support structure including a bed and a superstructure; a general purpose message board supported by the supporting structure of the trailer, for communicating to drivers of passing vehicles a user-selected alpha-numeric message, the message board including a plurality of picture elements for displaying the message, the picture elements including light emitting diodes, the message board being mounted on a frame that is pivotably mounted on the superstructure so as to be pivoted between a stowed position and a display position; a lift mechanism mounted on the superstructure and connected to the frame, for raising and lowering the message board between the positions; an enclosure mounted on the trailer; an operator interface mounted in the enclosure, for programming the message to be displayed, the operator interface including a keyboard for receiving on-site operator input and a full-screen CRT display for displaying the message to the operator; a controller supported by the supporting structure, connected to interact with the operator interface, and connected to provide the programmed message to the message board, the controller including storage for pre-determined messages, and storage for user-defined messages, the controller being adapted to display the message on the display before the message is sent to the message board; and a generator group for powering the message board and the operator interface.

In preferred embodiments, the message board further includes a plurality of panels, each of the panels being replaceable separately, and a plurality of power supplies each connected to the picture elements in one of the panels, and wherein the power supplies are independently short-circuit protected; the message board includes at least 3584 light emitting diodes per line and is capable of displaying at least three lines of 18 inch characters with 1-8 characters per line, and each line is capable of being sub-divided into two separate lines of approximately 9 inch characters; the controller is adapted to cause the picture elements to flash at a variable, operator-selectable rate when programmed by the operator to do so, and the controller is adapted to cause the picture elements to be displayed at a dim intensity, for improved night viewing when programmed to do so by the operator; the device further includes a modem and a cellular telephone set connected to the controller for receiving off-site commands to change the message; the device further includes a computer interface connected to the controller for communicating directly with the controller; the superstructure further includes a shock absorbing structure for supporting the message board when in the stowed position, and the enclosure is a lockable cage positioned on shock mounts mounted on the supporting structure of the trailer, the cage protecting the controller and the user interface from shocks; the message board further includes a thermostat connected to at least one cooling fan, for cooling the message board; the device further includes a plurality of leveling jacks attached to the supporting structure of the trailer, for leveling the trailer and preventing it from being tipped over by wind.

In another aspect of the invention, the invention features a method of signalling traffic, including the steps of moving a signalling trailer to the required site; raising a message board from the moved trailer into a display position; programming, at the site, a message to be displayed on the moved trailer; confirming the accuracy of the message; and displaying the programmed message on the message board.

In preferred embodiments, the method further includes the step of remotely altering the displayed message; the method further includes the steps of lowering the message board into a stowed position after the step of displaying the message on the board, moving the trailer a second time, to a further site, and re-programming the twice-moved message board to display a different message; the method further includes the step of adjusting jacks on the trailer to firmly support the trailer.

The signalling trailer of the invention is an extremely versatile traffic signalling tool, which may be quickly programmed to provide a large number of messages. Indeed, the same trailer may be used to indicate an upcoming road work area and then later used to indicate a closed lane, reduced speed limit, or the like. This can be particularly advantageous in responding to unanticipated circumstances. The sign is self-contained, easily moved, and may be operated to provide a clear, readable message without the assistance of a specialized technician. The input terminal display permits an operator to preview the message before displaying it, so inadvertent display of erroneous or possibly dangerous messages is avoided. The remote programming feature makes the sign even more versatile, as it can be changed without requiring on-site personnel. Power back-up, surge suppression, short-circuit protection, shock absorption and weather proofing provide for a safe, rugged and dependable signalling means.

These and other features and advantages of the invention may be seen from the following description of a presently preferred embodiment, and from the claims.

DESCRIPTION OF A PRESENTLY PREFERRED EMBODIMENT

Figure 1:
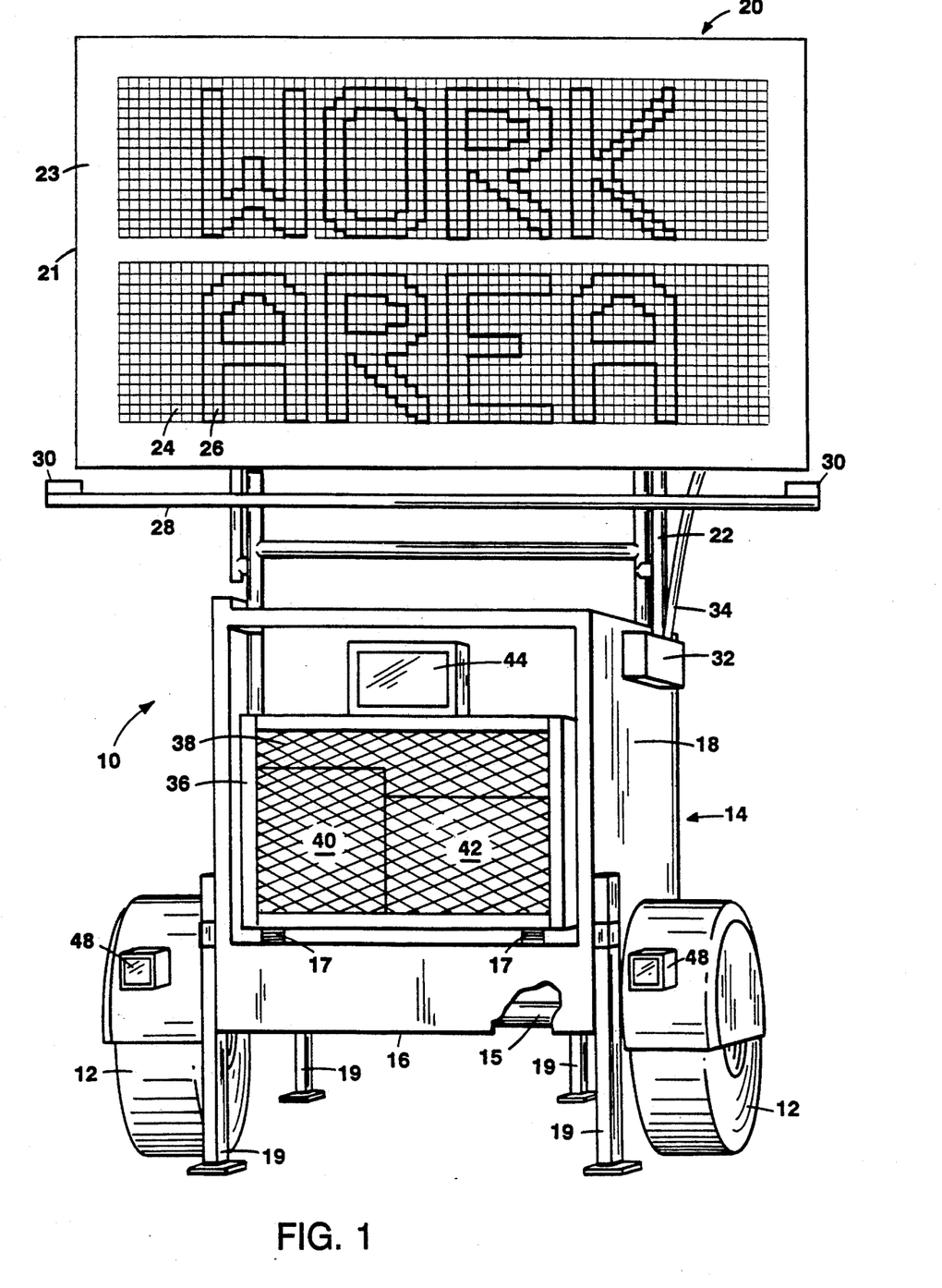
FIG. 1 is a rear perspective view of the traffic signalling trailer of the invention.

Referring to FIG. 1, a traffic signalling device 10 of the invention includes a trailer 14, supported by two, fifteen inch wheels 12 connected by a single axle 15. The trailer includes a 2 inch ball coupler with heavy duty safety chains. The trailer has a supporting structure that includes a bed 16 and a superstructure 18. On top of the superstructure there is a message board 20, which is mounted on a frame 22. The trailer is rugged in construction and may be towed at highway speeds and at low speed over rugged construction site terrain. The trailer is equipped with complete lighting 48 to standard highway specifications. The trailer is typically about 120 inches in length and about 96 inches wide.

The message board frame is disposed to pivot about the superstructure, so that the message board may be moved between two positions: a generally vertical display position and a generally horizontal stowed position. In FIG. 1, the message board is shown in its generally vertical display position. Pivoting the message board towards the back of the trailer to a horizontal position places it in its stowed position. In its stowed position, the message board rests on a shock absorbing structure including two shock absorbing blocks 30 at the ends of a flexible beam 28, attached to the superstructure. A lift mechanism 32 is mounted on the superstructure and receives a cable 34 attached to the message board frame. This mechanism serves to raise and lower the message board between positions. Leveling jacks 19 are attached to the bed of the trailer.

An enclosure, such as a cage 36, is mounted on the bed of the trailer and within the superstructure via shock absorbing mounts 17. The cage houses the electronic subsystems of the signalling trailer, generally shown as boxes 40, 42. The cage is covered in a thick mesh 38 and may be locked, in order to prevent tampering, theft or vandalism. A display 44, such as a full screen display, is connected to the electronic subsystems and may also be locked in the cage.

The message board 20 is made up of a large number, in this case 3584 per line, of red light emitting diodes (LEDs), which are grouped in sets of four to form picture elements (pixels) 24, 26. Each light emitting diode is rated to emit a luminous intensity of one candela, and therefore each pixel element is capable of emitting a luminous intensity of four candela. By selectively illuminating certain pixel elements 26 while leaving others 24 extinguished, a message to passing vehicles may be provided on the message board. In one embodiment, the message board is capable of displaying at least three lines of 18 inch characters with 1-8 characters per line, and each line is capable of being sub-divided into two separate lines of approximately 9 inch characters. The light emitting diodes on each line are divided among several (at least eight) panels, to facilitate repair and/or replacement of any inoperative or damaged section of the board. Each panel has at least eight columns and fourteen rows for operational clarity and visibility.

The message board is housed in a weatherproof aluminum enclosure 21 approximately 96 inches wide by 80 inches high by 4 inches deep. The housing includes an extruded, anodized aluminum portion, with a one-piece red Lexan ® face 23 and a one piece aluminum rear panel (not shown).

Figure 2:
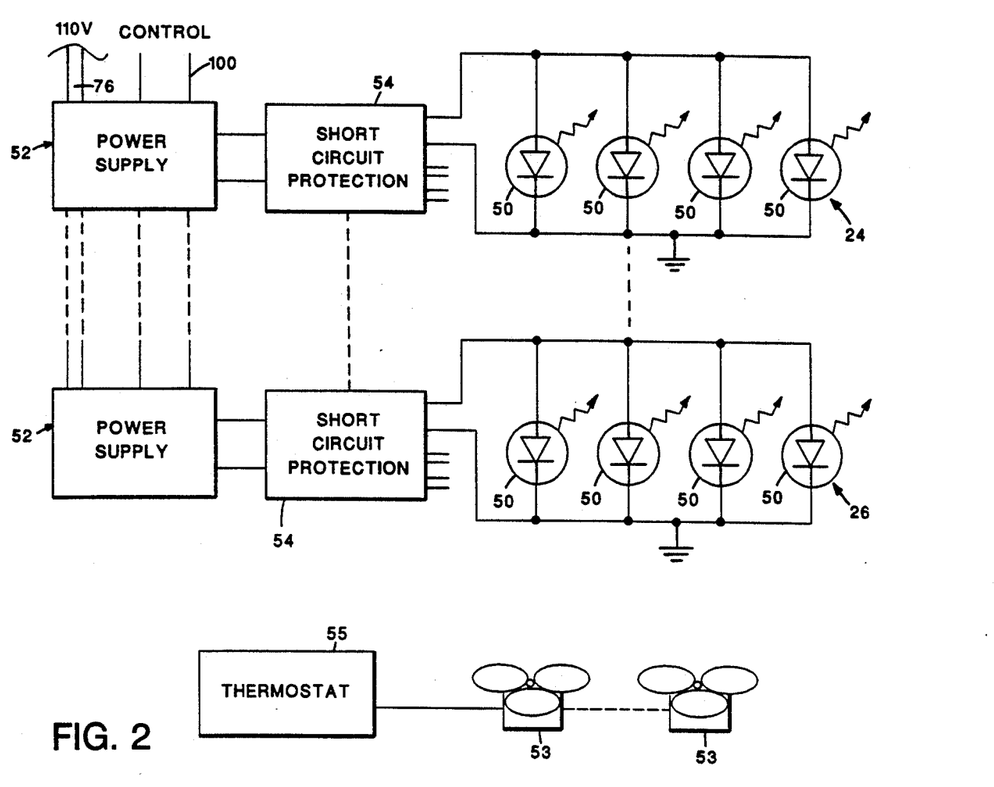
FIG. 2 is an illustrative schematic diagram of the message board display circuitry.

Referring to FIG. 2, Each line of the message board includes four (4) 100% solid-state switching power supplies 52 which each drive light emitting diodes 50 from two panels. The power supplies include short-circuit protection circuitry 54, so that short circuited elements will not damage the power supplies, and so that single short-circuits will not cause all of the picture elements to be extinguished. The power supplies have an efficiency of better than 80%. The message board internal temperature is continuously monitored by a thermostat 55, which controls cooling fans 53. Exhaust and intake ports for the fans are protected against moisture intrusion during transportation. The message board power supplies receive instruction signals 100 from the controller (CPU) 82 (see FIG. 4) and 110 volt AC power from the generator group 60 (see FIG. 3).

Figure 3:
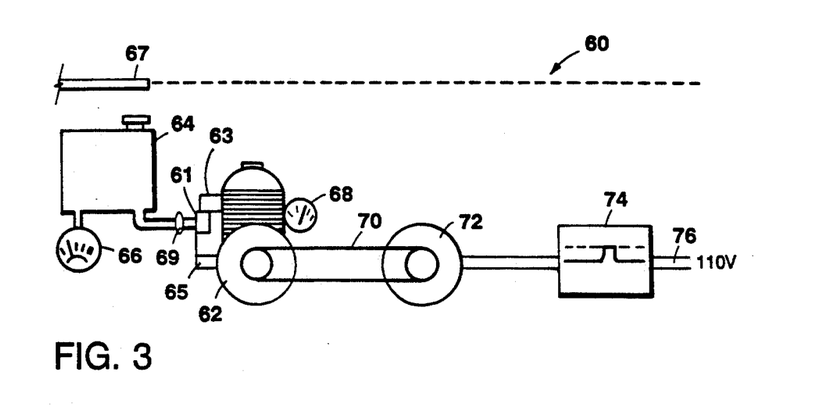
FIG. 3 is a diagrammatic representation of the generator group.

Referring to FIG. 3, the generator group includes a gasoline-powered or diesel-powered internal combustion engine 62 attached to a fuel tank 64. The fuel tank bears a fuel gauge 66, and the engine has an engine hour meter 68. The engine also has a low pressure shutdown mechanism 65 and is equipped with electronic ignition 63, an electronic fuel pump 61 and a fuel filter 69. The engine is coupled to an electric generator 72 via a direct-drive coupling 70. The generator provides a 110 volt output (AC), and is connected to a surge suppressor 74, which eliminates possibly harmful power surges in the generated potential. The generator group is housed in a weather protecting cover 67. The output of the generator group 76 is provided to the message board 20 and the electronic subsystem 82.

Figure 4:
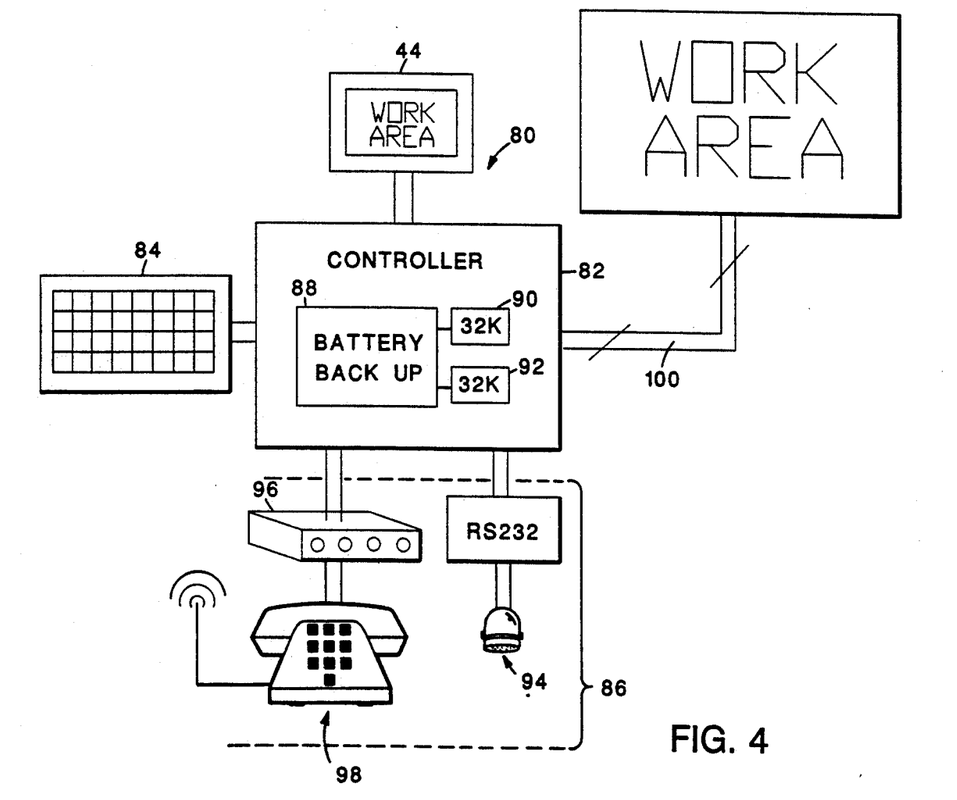
FIG. 4 is a diagrammatic representation of the major electronic subsystems of the invention.

Referring to FIG. 4, the electronic subsystems 80 include an operator interface, which comprises an input device 84, such as a standard keyboard, and a display 44, such as a CRT display, which are both connected to a controller 82. Additionally, supplemental input devices 86 may be connected to the controller.

The controller 82 includes a first 32K bank of RAM 90, and an optional second 32K bank of archive RAM 92. The RAM banks are provided with battery back-up circuitry permitting them to retain their contents without external power, for an extended period (e.g., a month). The supplemental input devices 86 include a cellular telephone set 98 connected to the controller via a modem 96, and a serial interface (94 e.g., RS232), which may also be connected to the controller.

In operation, referring to FIG. 1, the signalling trailer may be placed in its stowed position, coupled to a vehicle and transported to an area where it is needed, such as a road hazard, construction site, or the like. The message board is mounted on a shock absorbing structure, so it will be protected from damage during highway transportation, and on rugged construction site terrain at low speeds. As the cage is mounted on shock absorbing mounts, the electronics subsystems are also protected from shock damage.

Upon arrival, the trailer may be parked at a suitable position for viewing by the occupants of passing vehicles, and its leveling jacks 19 adjusted to firmly support the signalling trailer. The jacks may level the trailer on inclined or uneven ground and/or prevent the trailer from tipping over in high wind conditions. In one embodiment, the jacks are capable of leveling the trailer on a 1 in 6 grade and can withstand winds of up to 80 miles per hour.

Referring to FIGS. 2 and 4, the operator may then program an alpha-numeric, or graphic, message for presentation to passing drivers. To do this, the operator enters the words to be displayed on the input device 84. Alternatively, the operator may select from a series of pre-defined messages, or earlier user-created messages. In the present configuration, the user may select from at least 200 pre-defined messages and may store at least 200 user-created messages. These messages are stored in the RAM banks 90, 92, which are battery backed-up 88 to survive possible loss of power. The user may also set the variable flash rate of the message, or may dim the message for improved legibility at night.

The controller 82 processes the operator's input and displays it on the display 44. The display allows the operator to check the message format and content before displaying it to passing vehicles, which could be potentially hazardous if incorrect. Once confirmed, the controller translates the user's entry to instruction signals 100, which it provides to the message board power supplies 52. The message board power supplies selectively energize the light emitting diodes 50, and thereby display the message on the message board.

The operator may then raise the message board, if it is not already in its display position. To do this, the operator simply operates the lift mechanism 32 to reel in the cable 34, raising the frame 22 and the message board 20 from its stowed position to its display position (see FIG. 1). The mechanism is then locked to keep the board in its display position. The operator may then also lock the cage to protect the electronic subsystems.

The signalling trailer can then be uncoupled, if it is not already, and the signalling trailer left unattended. The generator group provides power to the board and controller, so that it may operate unattended for a long period, e.g., 60 hours. An optional diesel generator may provide at least 100 hours of unattended operation. The fuel gauge allows the operator to determine how long the generator will be capable of operating unattended. The engine hour meter provides an indication for when service is required.

The unattended signalling trailer may be controlled from a remote location, saving the expense of dispatching an operator to the traffic signalling site. This is done by sending commands from a computer, such as an IBM PC running manufacturer-supplied software package, and modem to the signalling trailer via its cellular telephone set 98 and modem 96. It is possible to change and/or delete messages in this way. The optional RS232 interface 94 allows more direct interfacing of external systems to the signalling trailer.

In one embodiment of the invention, the trailer is capable of performing all of its functions at ambient temperatures ranging from −20° F. to +120° F. Operation is not degraded by fog, rain or snow. Appropriate operator repair and upkeep documentation is provided, and all parts are readily accessible for ease of use and maintenance.

Other embodiments are within the scope of the following claims.

I claim:

1. A moveable traffic signalling trailer device, comprising a trailer having wheels and adapted to be towed to a remote, exposed site and left in unattended, message-displaying operation for periods of time, and a message board supporting structure mounted on said trailer, a general purpose message board supported by said message board supporting structure of said trailer, for communicating to drivers of passing vehicles a user-selected alpha-numeric message, said message board including a plurality of picture elements (pixels) for displaying the message, said plurality of picture elements include light emitting diodes, an operator interface mounted on said trailer, for programming the message to be displayed at the remote site at which said trailer is to be left in unattended, message-displaying operation, and a controller supported by said trailer, connected to interact with said operator interface and connected to provide the programmed message to said message board.

2. The traffic signalling trailer device of claim 1 wherein said operator interface includes an input device connected to said controller, for receiving on-site operator input and a display connected to said controller for displaying the message to the operator.

3. The traffic signalling trailer device of claim 2 wherein said controller is adapted to display the message on said display before the message is sent to the message board.

4. The traffic signalling trailer device of claim 2 wherein said input device is a keyboard and said display is a full-screen CRT display.

5. The traffic signalling trailer device of claim 1 wherein each said picture element (pixel) includes four of said light emitting diodes.

6. The traffic signalling trailer device of claim 1 wherein said message board further includes a plurality of power supplies each connected to some of said picture elements (pixels), and said power supplies are independently short-circuit protected.

7. The traffic signalling trailer device of claim 1 wherein said message board includes at least 3584 light emitting diodes per line.

8. The traffic signalling trailer device of claim 1 wherein said message board is capable of displaying at least three lines of 18 inch characters with at least 1-8 characters per line, and each line is capable of being sub-divided into two separate lines of approximately 9 inch characters.

9. The traffic signalling trailer device of claim 1 wherein said controller is adapted to cause said picture elements (pixels) to flash at a variable, operator-selectable rate when programmed to do so by the operator.

10. The traffic signalling trailer device of claim 1 wherein said controller is adapted to cause said picture elements (pixels) to be displayed at a dim intensity, for improved night viewing.

11. The traffic signalling trailer device of claim 1 wherein said controller includes memory for storage of messages.

12. The traffic signalling trailer device of claim 11 wherein said memory includes storage for pre-determined messages, and storage for user-defined messages.

13. The traffic signalling trailer device of claim 1 further including a generator group for powering said message board and said operator interface.

14. The traffic signalling trailer device of claim 13, wherein said generator group includes a surge suppressor.

15. The traffic signalling trailer device of claim 1 wherein said support structure includes a bed and a superstructure, and said message board is mounted on a frame that is mounted on said superstructure so as to be moveable between a stowed position and an elevated display position.

16. The traffic signalling trailer device of claim 15 wherein said superstructure further includes a shock absorbing structure for supporting said message board when in the stowed position.

17. The traffic signalling trailer device of claim 15 further including a lift mechanism mounted on said superstructure and connected to said frame via a cable, for raising and lowering said message board.

18. The traffic signalling trailer device of claim 1, further including a lockable cage positioned on shock mounts mounted on said supporting structure of said trailer, for housing said controller and said user interface, and protecting said controller and said user interface from shocks.

19. The traffic signalling trailer device of claim 1, further including a modem and a cellular telephone set connected to said controller for receiving off-site commands to change the message.

20. The traffic signalling trailer device of claim 1, further including a computer interface connected to said controller for communicating directly with said controller.

21. The traffic signalling trailer device of claim 1, wherein said message board is made up of a plurality of panels, each of said panels being replaceable separately.

22. The traffic signalling trailer device of claim 1, further including a plurality of leveling jacks attached to said supporting structure of said trailer, for leveling said trailer and preventing it from being tipped over by wind.

23. The traffic signalling trailer device of claim 11, wherein said plurality of picture elements (pixels) include light emitting diodes.

24. A moveable traffic signalling trailer device, comprising
a trailer having wheels and a supporting structure,
a general purpose message board supported by said supporting structure of said trailer, for communicating to drivers of passing vehicles a user-selected alpha-numeric message, said message board comprising a thermostat connected to at least one cooling fan, for cooling said message board,
an operator interface mounted on said supporting structure, for programming the message to be displayed at the site at which it is to be displayed, and
a controller supported by said supporting structure, connected to interact with said operator interface and connected to provide the programmed message to said message board.

25. The traffic signalling trailer device of claim 24, wherein said message board further comprises a plurality of picture elements (pixels) for displaying the message.

26. The traffic signalling trailer device of claim 25, wherein said controller is adapted to cause said picture elements (pixels) to flash at a variable, operator-selectable rate when programmed to do so by the operator.

27. The traffic signalling trailer device of claim 24, wherein said message board is made up of a plurality of panels, each of said panels being replaceable separately.

28. A moveable traffic signalling trailer device, comprising
a trailer having wheels and adapted to be towed to a remote, exposed site and left in unattended, message-displaying operation for periods of time, and a message board supporting structure mounted on said trailer, said supporting structure including a bed and a superstructure,
a general purpose message board supported by said supporting structure of said trailer, for communicating to drivers of passing vehicles a user-selected alpha-numeric message, said message board including a plurality of picture elements for displaying the message, said picture elements including light emitting diodes, said message board being mounted on a frame that is mounted on said superstructure so as to be moveable between a stowed position and an elevated display position, a lift mechanism mounted on said superstructure and connected to said frame, for raising and lowering said message board between said positions, an enclosure mounted on said trailer, an operator interface mounted on said trailer, for programming the message to be displayed, said operator interface including a keyboard for receiving on-site operator input and a full-screen CRT display for displaying the message to the operator, a controller supported by said supporting structure, connected to interact with said operator interface, and connected to provide the programmed message to the message board, said controller including storage for pre-determined messages, and storage for user-defined messages, said controller being adapted to display the message on said display before the message is sent to the message board, and a generator group for powering said message board and said operator interface.

29. The traffic signalling trailer device of claim 26 wherein said message board further includes a plurality of panels, each of said panels being replaceable separately, and a plurality of power supplies each connected to said picture elements in one of said panels, and wherein said power supplies are independently short-circuit protected.

30. The traffic signalling trailer device of claim 28 wherein said message board includes at least 3584 light emitting diodes per line and is capable of displaying at least three lines of 18 inch characters with at least 1–8 characters per line, and each line is capable of being sub-divided into two separate lines of approximately 9 inch characters.

31. The traffic signalling trailer device of claim 28 wherein said controller is adapted to cause said picture elements to flash at a variable, operator-selectable rate when programmed by the operator to do so, and wherein said controller is adapted to cause said picture elements to be displayed at a dim intensity, for improved night viewing.

32. The signalling trailer device of claim 28, further including a modem and a cellular telephone set connected to said controller for receiving off-site commands to change the message.

33. The signalling trailer device of claim 28, further including a computer interface connected to said controller for communicating directly with said controller.

34. The traffic signalling trailer device of claim 28 wherein said superstructure further includes a shock absorbing structure for supporting said message board when in the stowed position, and wherein said enclosure is a lockable cage positioned on shock mounts mounted on said supporting structure of said trailer, said cage protecting said controller and said user interface from shocks.

35. The signalling trailer device of claim 28, further including a plurality of leveling jacks attached to said supporting structure of said trailer, for leveling said trailer and preventing it from being tipped over by wind.

36. A moveable traffic signalling trailer device, comprising:

a trailer having wheels and a supporting structure, said supporting structure including a bed and a superstructure, a general purpose message board supported by said supporting structure of said trailer, for communicating to drivers of passing vehicles a user-selected alpha-numeric message, said message board including a plurality of picture elements for displaying the message, said picture elements including light emitting diodes, said message board being mounted on a frame that is mounted on said superstructure so as to be moveable between a stowed position and an elevated display position, said message board further including a thermostat connected to at least one cooling fan, for cooling said message board, lift mechanism mounted on said superstructure and connected to said frame, for raising and lowering said message board between said positions, an enclosure mounted on said trailer, an operator interface mounted in said enclosure, for programming the message to be displayed, said operator interface including a keyboard for receiving on-site operator input and a full-screen CRT display for displaying the message to the operator, a controller supported by said supporting structure, connected to interact with said operator interface, and connected to provide the programmed message to said message board, said controller including storage for pre-determined messages, and storage for user-defined messages, said controller being adapted to display the message on said display before the message is sent to the message board, and a generator group for powering said message board and said operator interface.

* * * * *

Disclaimer and Dedication

5,257,020—Robert H. Morse, Westborough, Mass. VARIABLE MESSAGE TRAFFIC SIGNALLING TRAILER. Patent dated October 26, 1993. Disclaimer and Dedication filed December 27, 1999, by the assignee, Fiber-Optics Sales Co., Inc.

Hereby disclaims and dedicates to the Public the entire term of said patent.
*(Official Gazette, May 8, 2001)*

REEXAMINATION CERTIFICATE (4626th)

United States Patent
Morse (10) Number: US 5,257,020 C1
(45) Certificate Issued: Aug. 13, 2002

(54) VARIABLE MESSAGE TRAFFIC SIGNALLING TRAILER

(75) Inventor: Robert H. Morse, Westborough, MA (US)

(73) Assignee: Fiber-Optics Sales Co., Inc., Worcester, MA (US)

Reexamination Request:
No. 90/003,765, Mar. 23, 1995

Reexamination Certificate for:
Patent No.: 5,257,020
Issued: Oct. 26, 1993
Appl. No.: 07/714,259
Filed: Jun. 12, 1991

Disclaimer of Claims 1 to 36 Filed Dec. 27, 1999 (1246 OG 43).

(51) Int. Cl.⁷ ................................................. B60Q 7/00
(52) U.S. Cl. ..................... 340/908.1; 340/471; 340/473; 340/815.27; 340/908
(58) Field of Search ................................. 340/907, 908, 340/908.1, 470, 471, 472, 473, 479, 815.12, 815.23, 815.24, 815.27, 815.45; 345/55, 56, 82, 83

(56) References Cited

U.S. PATENT DOCUMENTS

| | | | |
|---|---|---|---|
| 2,920,408 A | 1/1960 | McGuire | 40/452 |
| 3,702,033 A | 11/1972 | Coleman | 40/541 |
| 3,727,214 A | 4/1973 | Wayne | 324/326 |
| 3,768,073 A | 10/1973 | Rawson et al. | 345/46 |
| 3,883,846 A | 5/1975 | Bruner | 40/550 |
| 4,006,476 A | 2/1977 | Romney | 340/815.62 |
| 4,077,144 A | 3/1978 | Smits | 40/590 |
| 4,087,785 A | 5/1978 | Dodich | 340/908.1 |
| 4,095,215 A | 6/1978 | Mortimer | 340/825.71 |
| 4,268,826 A | 5/1981 | Scott et al. | 345/183 |
| 4,271,408 A | 6/1981 | Teshima et al. | 345/83 |
| 4,298,869 A | * 11/1981 | Okuno | 345/82 |
| 4,543,905 A | 10/1985 | McKenney | 116/63 P |
| 4,571,868 A | 2/1986 | Forestal | 40/590 |
| 4,574,269 A | 3/1986 | Miller | 362/80.1 |
| 4,593,265 A | 6/1986 | McKenney | 340/908.1 |
| 4,868,542 A | 9/1989 | Thompson | 340/468 |
| 4,868,719 A | 9/1989 | Kouchi et al. | 362/61 |
| 4,886,328 A | * 12/1989 | Iino | 340/980 |
| 4,928,084 A | 5/1990 | Reiser | 340/479 |
| 5,061,921 A | 10/1991 | Lesko et al. | 340/815.83 |
| 5,136,287 A | * 8/1992 | Borenstein | 340/815.45 |

FOREIGN PATENT DOCUMENTS

GB          2 175 428 A        11/1986

OTHER PUBLICATIONS

Multisonics WinkoMatic, *Gen III Users Manual*, (before Jun. 1990).
"Traffic Conrol Products from Signal", Feb. 24, 1983; by Lear Siegler, Inc, signal division.
Bemis & Son, Inc. "Bemis . . . the name in flashing Arrows?" Feb. 24, 1983 by Bemis & Son, Inc.

\* cited by examiner

Primary Examiner—Jeff Hofsass (57) ABSTRACT

A moveable traffic signaling which includes a trailer having wheels and a supporting structure; a general purpose message board supported by the supporting structure of the trailer, for communicating to drivers of passing vehicles a user-selected alpha-numeric message; an operator interface mounted on the supporting structure, for programming the message to be displayed at the site at which it is to be displayed; and a controller supported by the supporting structure, connected to interact with the operator interface and connected to provide the programmed message to the message board.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–36 are now disclaimed.

\* \* \* \* \*